United States Patent
Spray et al.

(10) Patent No.: US 11,644,070 B2
(45) Date of Patent: May 9, 2023

(54) BRAKE DISC INSERT WITH RETAINER

(71) Applicant: Honeywell International Inc., Morris Plains, NJ (US)

(72) Inventors: Matthew Spray, Elkhart, IN (US); Brett Baginski, South Bend, IN (US); Craig Fettig, Michigan City, IN (US); Jonathan T. Beehler, Bremen, IN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/748,836

(22) Filed: Jan. 22, 2020

(65) Prior Publication Data

US 2021/0222745 A1    Jul. 22, 2021

(51) Int. Cl.
*F16D 65/12*    (2006.01)
*F16D 55/226*    (2006.01)
(Continued)

(52) U.S. Cl.
CPC .......... *F16D 55/2262* (2013.01); *B60T 1/065* (2013.01); *B64C 25/44* (2013.01); *F16D 2055/0008* (2013.01)

(58) Field of Classification Search
CPC ............ F16D 65/126; F16D 2065/136; F16D 2065/1364; F16D 2065/1368;
(Continued)

(56) References Cited

U.S. PATENT DOCUMENTS 3,345,109 A    10/1967    Petersen et al.
3,605,967 A    9/1971    Warren et al.
(Continued)

FOREIGN PATENT DOCUMENTS

DE    10159799 A1    6/2003
EP    1988305 A1    11/2008
(Continued)

OTHER PUBLICATIONS

"Aircraft Wheels—Wheel Construction," Flight Mechanic, accessed from http://www.flight-mechanic.com/aircraft-wheels-wheel-construction/, accessed on Aug. 2, 2019, 6 pp.
(Continued)

*Primary Examiner* — Bradley T King
*Assistant Examiner* — Stephen M Bowes
(74) *Attorney, Agent, or Firm* — Shumaker & Sieffert, P.A.

(57) ABSTRACT

In some examples, a drive insert comprises a clip and a retainer. The clip is configured to be slidable over a surface adjacent to a drive slot of a brake disc in a tangential direction of the brake disc. The retainer is configured to be slidable over the clip when the clip is positioned over the surface to secure the clip to the brake disc. In some examples, the clip may comprise a body section and first and second arms extending from the body section. The retainer may comprise first and second legs configured to contact the first arm and the second arm of the clip when the retainer is positioned over the clip. The first and second legs may be resiliently biased to provide an inward clamping force on the clip when the retainer is positioned over the clip.

19 Claims, 8 Drawing Sheets

(51) Int. Cl.
  *B60T 1/06* (2006.01)
  *B64C 25/44* (2006.01)
  *F16D 55/00* (2006.01)

(58) Field of Classification Search
  CPC ..... F16D 2065/1392; F16D 2065/1396; F16D 2055/0058; F16D 55/40; F16D 13/648; F16D 13/683; F16D 2055/0008; B60T 1/065; B64C 25/44
  See application file for complete search history.

(56) References Cited

U.S. PATENT DOCUMENTS

| | | | |
|---|---|---|---|
| 3,972,395 A * | 8/1976 | Jannasch | F16D 55/40 188/251 A |
| 4,083,434 A * | 4/1978 | Pinter | F16D 65/126 188/218 XL |
| 4,155,432 A | 5/1979 | Krause | |
| 4,465,165 A * | 8/1984 | Bok | F16D 65/126 188/218 XL |
| 4,511,021 A | 4/1985 | Grider | |
| 4,557,356 A | 12/1985 | Petersen | |
| 4,742,948 A | 5/1988 | Fisher et al. | |
| 4,784,246 A | 11/1988 | Edmisten | |
| 4,863,001 A | 9/1989 | Edmisten | |
| 4,865,160 A | 9/1989 | Casey | |
| 5,273,140 A | 12/1993 | Berwanger | |
| 5,560,452 A | 10/1996 | Labougle | |
| 6,635,355 B2 | 10/2003 | Bianco et al. | |
| 6,843,350 B2 | 1/2005 | Larkin et al. | |
| 7,410,036 B2 | 8/2008 | Wimmer et al. | |
| 7,766,133 B2 | 8/2010 | Cress | |
| 7,802,758 B2 | 9/2010 | Cress et al. | |
| 8,365,882 B2 | 2/2013 | Kirschner et al. | |
| 9,897,153 B2 | 2/2018 | Tremblay | |
| 9,976,612 B2 | 5/2018 | Tremblay | |
| 10,221,905 B2 | 3/2019 | Stevenson | |
| 10,436,265 B2 | 10/2019 | Stevenson | |
| 2007/0181388 A1* | 8/2007 | Schlitz | F16D 65/12 188/71.9 |
| 2007/0193836 A1 | 8/2007 | Walker et al. | |
| 2008/0041674 A1 | 2/2008 | Walker et al. | |
| 2013/0008749 A1 | 1/2013 | Sandberg et al. | |
| 2018/0128331 A1 | 5/2018 | Stevenson | |
| 2019/0048949 A1 | 2/2019 | Stevenson | |
| 2021/0222745 A1 | 7/2021 | Spray et al. | |
| 2022/0128108 A1 | 4/2022 | Spray et al. | |

FOREIGN PATENT DOCUMENTS

| | | |
|---|---|---|
| EP | 1798438 B1 | 11/2012 |
| EP | 3168492 A2 | 5/2017 |
| EP | 3441638 A1 | 2/2019 |
| EP | 3855038 A1 | 7/2021 |
| FR | 2266054 A1 | 10/1975 |
| FR | 2719879 A1 | 11/1995 |
| GB | 1475237 A | 6/1977 |
| GB | 2139300 A | 11/1984 |
| RU | 2093726 C1 | 10/1997 |
| WO | 2019115287 A1 | 6/2019 |

OTHER PUBLICATIONS

U.S. Appl. No. 16/856,141, by Honeywell International Inc. (Inventors: Lindner et al.), filed Apr. 23, 2020.

U.S. Appl. No. 17/079,222, by Honeywell International, Inc. (Inventors: Spray et al.), filed Oct. 23, 2020 (Atty docket No. H218664-US/1147-158US01).

Extended Search Report from counterpart European Application No. 21150444.4, dated May 7, 2021, 6 pp (Atty Tocket No. H214793-EP/1147-143EP01).

Response to Extended Search Report dated May 7, 2021, from counterpart European Application No. 21150444.4, filed May 26. 2021, 61 pp. (Atty docket No. H214793-EP/1147-143EP01).

Notice of Intent to Grant and Text Intended to Grant from counterpart European Application No. 21150444.4 dated Dec. 21, 2021, 80 pp. (Attorney Docket No. H214793-EP/1147-143EP01).

Notice of Allowance from U.S. Appl. No. 17/079,222 dated Sep. 29, 2022, 5 pp. (Attorney Docket Mo. H218664-US/1147-158US01).

Response to Office Action dated Apr. 4, 2022 from U.S. Appl. No. 17/079,222, filed Jul. 1, 2022, 11 pp. [Attorney Docket No. H218664-US/1147-158US01).

Office Action from U.S. Appl. No. 17/079,222, dated Apr. 4, 2022, 6 pp. (Attorney Docket No. H218664-JS/1147-158US01).

* cited by examiner

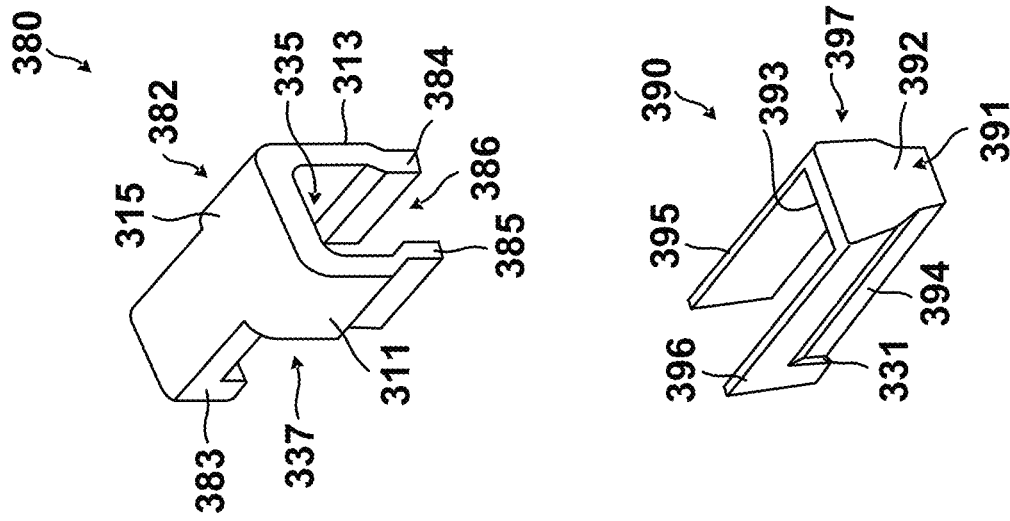
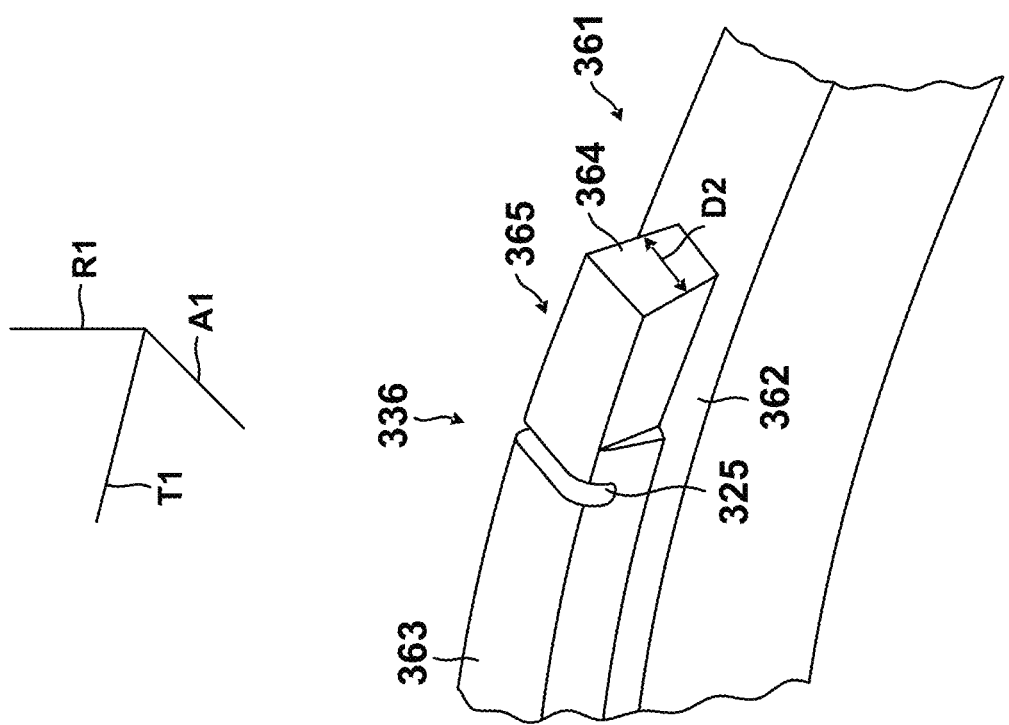
FIG. 5
FIG. 4

BRAKE DISC INSERT WITH RETAINER

TECHNICAL FIELD

The present disclosure relates to wheel brake systems of a vehicle, and in particular, brake disc insert assemblies for wheel brake systems of a vehicle.

BACKGROUND

Vehicles, such as aircrafts, may use a wheel brake system that includes a multi-disc brake assembly. For example, the multi-disc brake assembly may include a plurality of rotors engaged with a wheel and a plurality of stators interleaved with the rotors. The rotors and wheel are configured to rotate around an axle, while the stators remain rotationally stationary. To decelerate rotational motion of a rotating wheel, the brake assembly may displace pistons against a pressure plate to squeeze the rotating rotors engaged with the wheel against the stationary stators, therefore producing torque that decelerates the rotational motion of the wheel. In some examples, the rotors may engage with the wheel via rotor drive keys positioned on an interior surface of the wheel. In some such examples, the rotors may define slots configured to receive the rotor drive keys.

SUMMARY

In general, the disclosure describes articles, systems, and techniques relating to a drive insert for a brake disc in a wheel brake system of a vehicle. The drive insert is configured to be mechanically coupled to the brake disc. In some cases, the brake disc may be part of a brake disc stack of a braking system of a vehicle, where the brake disc stack includes a plurality of brake discs. The brake disc may be configured to have one or more drive slots around the brake disc periphery, the drive slots being configured to receive a rotor drive key of the wheel brake system. The drive insert is configured to mechanically couple with the brake disc at a drive slot. The drive insert may be configured such that some portion of the drive insert resides within the drive slot of the brake disc. Some portion of the drive insert may reside within the drive slot of the brake disc and a rotor drive key of the braking system when the brake disc stack is assembled within the braking system. The drive insert may be configured to help protect the brake disc against, for example, the mechanical stresses borne by the drive slot of the brake disc during braking operations of a wheel braking system.

In examples described herein, the drive insert includes a clip and a retainer. The clip is configured to be slidable over a surface of a brake disc, where the surface is adjacent to a drive slot on an outer perimeter of the brake disc. The clip may be configured to slide over the surface in a substantially tangential direction of the brake disc. The retainer of the drive insert is configured to be positioned (e.g., slidable) over the clip when the clip is positioned over the surface. In some examples, the retainer may be configured to slide over the slip in a radial direction of the brake disc. The retainer may be configured in some examples such that the retainer is radially urged over the positioned clip. In some examples, the retainer may provide a snap-fit with the clip.

The drive insert may be configured such that the clip and the retainer substantially secure the drive insert to the brake disc without requiring a fastener (e.g., a rivet) or other element that penetrates through the drive insert and into the brake disc. In some examples, the clip comprises a first arm and a second arm extending from a body section. The clip may be configured such that the first arm engages a surface of the brake disc adjacent to the brake disc drive slot when the clip is positioned over the surface, and the second arm engages another surface on the opposite side of the brake disc. The first arm and the second arm may be configured to substantially conform to a cross-sectional profile of the brake disc in order to provide support in a radial direction of the brake disc. The body section of the clip may at least partially cover a torque face of the brake disc drive slot when the first arm engages the surface of the brake disc and the second arm engages the opposite surface of the brake disc. Surfaces of the retainer may define a channel, where the surfaces are resiliently biased to urge against the first arm and the second arm of the clip when the retainer is positioned over the first arm and the second arm.

In one example, the drive insert comprises a clip configured to be slidable over a surface of a brake disc in a tangential direction of the brake disc, wherein the surface is adjacent to a drive slot on a perimeter of the brake disc. The drive insert further comprises a retainer configured to be slidable over the clip when the clip is positioned over the surface, in order to secure the clip to the brake disc.

In one example, a brake system comprises a brake disc, wherein the brake disc defines a drive slot extending axially through the brake disc on a perimeter of the brake disc. The brake disc further comprises a first surface adjacent to the drive slot, wherein the first surface comprises a first side of the brake disc. The brake disc further comprises a second surface adjacent to the drive slot, wherein the second surface comprises a second side of the brake disc opposite the first side. The brake disc further comprises a torque face between the first surface and the second surface. The brake system additionally comprises a clip, with the clip comprising a body section, a first arm extending from the body section, and a second arm extending from the body section. The first arm is configured to cover some portion of the first surface when the body section covers a portion of the torque face. The second arm is configured to cover some portion of the second surface when the body section covers the portion of the torque face. The brake system further comprises a retainer configured to be slidable over the clip, where the retainer is configured to contact the first arm and the second arm when the retainer slides over the clip.

In one example, a technique comprises positioning a clip on a brake disc by sliding the clip in a tangential direction of the brake disc over a first surface and a second surface of the brake disc. The first surface and the second surface of the brake disc are adjacent to a drive slot extending axially through the perimeter of the brake disc. The first surface comprises a first side of the brake disc and the second surface comprises a second side opposite the first side. The technique further comprises positioning a retainer over the positioned clip in a radial direction of the brake disc.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is an isometric view of a section of a brake disc.

FIG. 5 is an isometric view of an example drive insert including a clip and a retainer.

DETAILED DESCRIPTION

Figure 1:
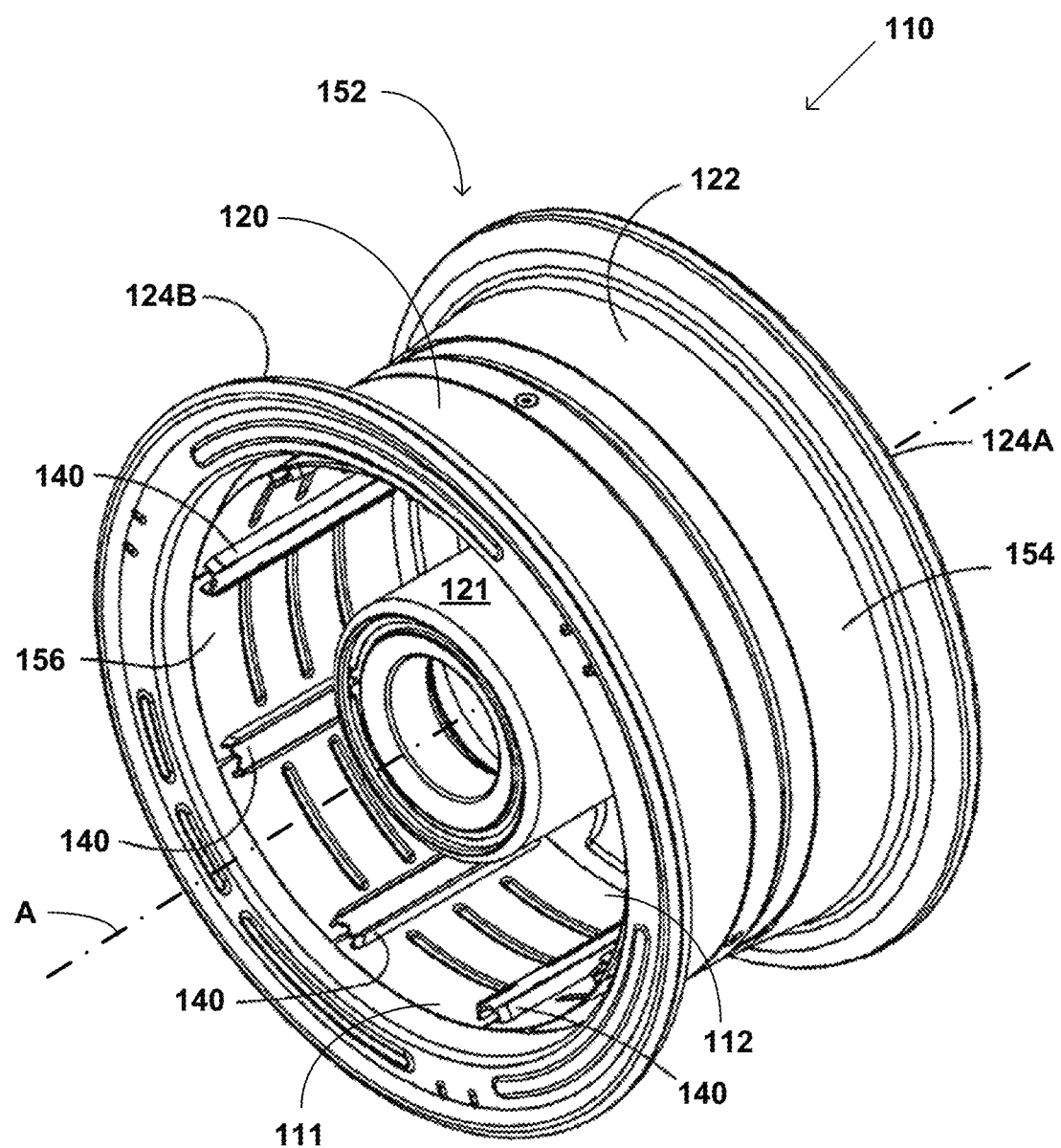
FIG. 1 is a perspective view illustrating an example wheel including a plurality of rotor drive keys on an interior surface of the wheel.

The disclosure describes articles, systems, and techniques relating to a drive insert for a brake disc in a wheel brake system of a vehicle. The drive insert described herein is configured to be mechanically coupled to a brake disc, which may be one of a plurality of brake discs of a brake disc stack of a vehicle braking system. The brake disc defines one or more drive slots around the brake disc periphery and the drive insert may be configured to mechanically couple with the brake disc at the drive slot. The drive insert is configured such that at least some portion of the drive insert resides between the drive slot of a brake disc and a rotor drive key when the brake disc is assembled within a braking system. The drive insert may be configured to protect the brake disc against, for example, the mechanical stresses borne by the drive slot of the brake disc during braking operations of a wheel braking system. For example, the drive insert may be configured to help distribute the load from the drive key and/or splines to the brake disc and/or to reduce wear on the brake disc.

In examples described herein, the drive insert includes a clip and a retainer. The clip is configured to be slidable over a surface of a brake disc, where the surface is adjacent to the drive slot on the outer perimeter of the brake disk. The clip may be configured to slide over the surface in a substantially tangential direction of the brake disc. The retainer of the drive insert may then be positioned over the clip to help secure the clip to the brake disc. For example, the retainer of the drive insert can be configured to be slidable over the clip in a radial direction of the brake disc when the clip is positioned over the surface. The retainer may be configured such that the retainer is radially urged over the positioned clip. In some examples, the retainer provides a snap-fit with the clip.

The drive insert may be configured such that the clip and the retainer substantially secure the drive insert to the brake disc without requiring a fastener (e.g., a rivet) or other element to penetrate through the drive insert and into the brake disc. Rivets and other fasteners which attach drive inserts to brake rotors may undergo fatigue due to the cyclic vibrations and stresses which occur over repeated braking operations. This may lead to rivet failure and compromise of the attachment between the drive insert and the brake disc, as well as the presence of loose hardware floating within the brake system. Additionally, rivets and other through-fasteners may necessarily require a rivet hole through the surface of a brake disc, compromising the surface integrity of the brake disc and potentially creating stress concentrations around the hole when the brake disc is subject to braking load. The installation of one or more rivets within a brake disc may also stress the brake disc in the immediate vicinity of the rivets, as the rivet tail expands within the rivet hole to provide a fastening function between a drive insert and the brake disc.

Wheel brake systems may include a wheel hub configured to rotate around a central axle. The wheel hub may be mechanically coupled to the axle by bearings or some other mechanism which provides support while enabling the wheel to rotate around the axle. In some cases, a wheel brake system may include one or more rotor brake discs configured to rotate around the axle substantially synchronously with the wheel. The wheel brake system may further include one or more stator brake discs interleaved with the rotor brake discs, with the stator brake discs configured to remain stationary with respect to the axle. The rotor brake discs and stator brake discs may thus comprise a disc stack where, during wheel rotation, the rotor brake discs rotate substantially synchronously with the wheel around the axle while the interleaved stator brake discs remain stationary with respect to the axle. Each rotor brake disc and stator brake disc may have one or more friction surfaces configured to face a friction surface of an adjacent brake disc within the disc stack.

Each rotor brake disc and stator brake disc may also be configured to translate in a direction substantially parallel with the axle, allowing the disc stack to be compressed and contact established between adjacent rotor and stator brake discs. During a braking operation, the disc stack may be compressed, for example by one or more piston and cylinder assemblies, in order to urge the friction surfaces into engagement. The engagement between friction surfaces of the rotor brake discs rotating around the axle and the stator brake discs stationary with respect to the axle converts the kinetic energy of the rotating rotor brake discs into thermal energy and slows the rotation of the rotor brake discs. Due to the mechanical coupling between the rotor brake discs and the wheel hub, rotation of the wheel hub is similarly reduced.

During the braking operation, while the disc stack is compressed, the rotor brake discs and stator brake discs may generate significant shearing forces on their friction surfaces. These forces are generally transmitted through the rotor brake discs and stator brake discs to torque transmitting members, such as the aforementioned brake disc drive slots. Each rotor brake disc may include one or more drive slots around an outer perimeter of the rotor brake disc. When the brake assembly is assembled, a rotor drive key mounted to the wheel may extend through a respective drive slot. The rotor drive key and drive slot may be configured such that the drive slot imparts torque to the rotor drive key during braking, generating stresses in the rotor brake disc in the neighborhood of (e.g., proximate to) the drive slot. The drive insert disclosed here may be configured to protect the brake disc against, for example, the mechanical stresses borne by the drive slot of the brake disc as a result of torques on the brake disc generated from contact with the friction surface of one or more adjacent brake discs.

FIG. 1 is a perspective view illustrating an example wheel 110 including a plurality of rotor drive keys 140 on an interior surface 156 of wheel 110. In some examples, wheel 110 is a part of an aircraft vehicle. In other examples, wheel 110 may be a part of any other vehicle, such as, for example, any marine vessel, land vehicle, or other vehicle. Wheel 110 may include a rim 152 defining an exterior surface 154 and interior surface 156. Rim 152 may include a wheel hub 121, tubewell 120 and wheel outrigger flange 122. In some examples, interior surface 156 may include an inner diameter of a wheel hub 121 of wheel 110. For example, in some cases, interior surface 156 may be referred to as an inner diameter surface of wheel 110.

In some examples, a tire (not shown) may be mounted on exterior surface 154 of rim 152. For example, wheel 110 may include an inboard bead seat 124B and an outboard bead seat 124A configured to retain a tire on exterior surface 154 of rim 152.

Wheel 110 is configured to engage with one or more rotors (not shown in FIG. 1) of a braking assembly. For example, as shown in the example of FIG. 1, a plurality of rotor drive keys 140 are attached to interior surface 156, and each rotor drive key of the plurality of rotor drive keys 140 may be configured to engage with one or more rotors of a brake disc stack of a braking assembly. An example braking assembly will be described in more detail with respect to FIG. 2.

In some examples, each rotor drive key of the plurality of rotor drive keys 140 extends in a substantially axial direction of wheel 110 (e.g., in a direction parallel to the axis label "A" in FIG. 1, which can be an axis of rotation of wheel 110). For example, a length of each rotor drive key of the plurality of rotor drive keys 140 may extend in the substantially axial (e.g., axial or nearly axial to the extent permitted by manufacturing tolerances) direction of the axis A. In some such examples, the respective length of each rotor drive key 140 may extend from (or near) a first edge 111 of wheel 110 to (or close to) a second edge 112 of wheel 110. In this way, in some examples, a length of a rotor drive key 140 of the plurality of rotor drive keys 140 may be the same or substantially similar to (e.g., within 10%) a width of wheel 110 from the first edge to the second edge. In other examples, a length of a rotor drive key 140 may be less than the width of wheel 110.

The plurality of rotor drive keys 140 extending in the substantially axial direction may enable wheel 110 to slide onto a braking assembly. For example, a plurality of rotors of a braking assembly may include drive slots configured to receive the plurality of rotor drive keys 140, enabling the plurality of rotor drive keys 140 to be slid into respective drive slots of the plurality of rotors. In other examples, one or more rotor drive keys of the plurality of rotor drive keys 140 may be oriented in a different direction and/or may engage with one or more rotors in a different manner.

The plurality of rotor drive keys 140 may include any suitable number of rotor drive keys. The number of drive keys may be vehicle specific and may depend on, e.g., loads, size of parts, material property, and the like. In some examples, the number of the rotor drive keys included in the plurality of rotor drive keys 140 may correspond to a number of drive slots defined by a plurality of rotors of a braking assembly configured to receive the plurality of rotor drive keys 140. For example, each rotor drive key of the plurality of rotor drive keys 140 may correspond to a respective slot defined by the plurality of rotors of a braking assembly.

As illustrated in the example of FIG. 1, in some examples, the plurality of rotor drive keys 140 may be mounted at substantially equal circumferential distances around interior surface 156 of wheel 110. In other examples, one or more of the plurality of rotor drive keys 140 may be mounted a different circumferential distance from an adjacent rotor drive than at least one other rotor drive key. Here and elsewhere, circumferential distance means the length of an arc on the interior surface 156 of wheel 110 where the arc is in a plane perpendicular to the substantially axial direction of wheel 110. Rotor drive keys 140 may be integrally formed with tubewell 120 or may be separate from and mechanically affixed to tubewell 120.

Figure 2:
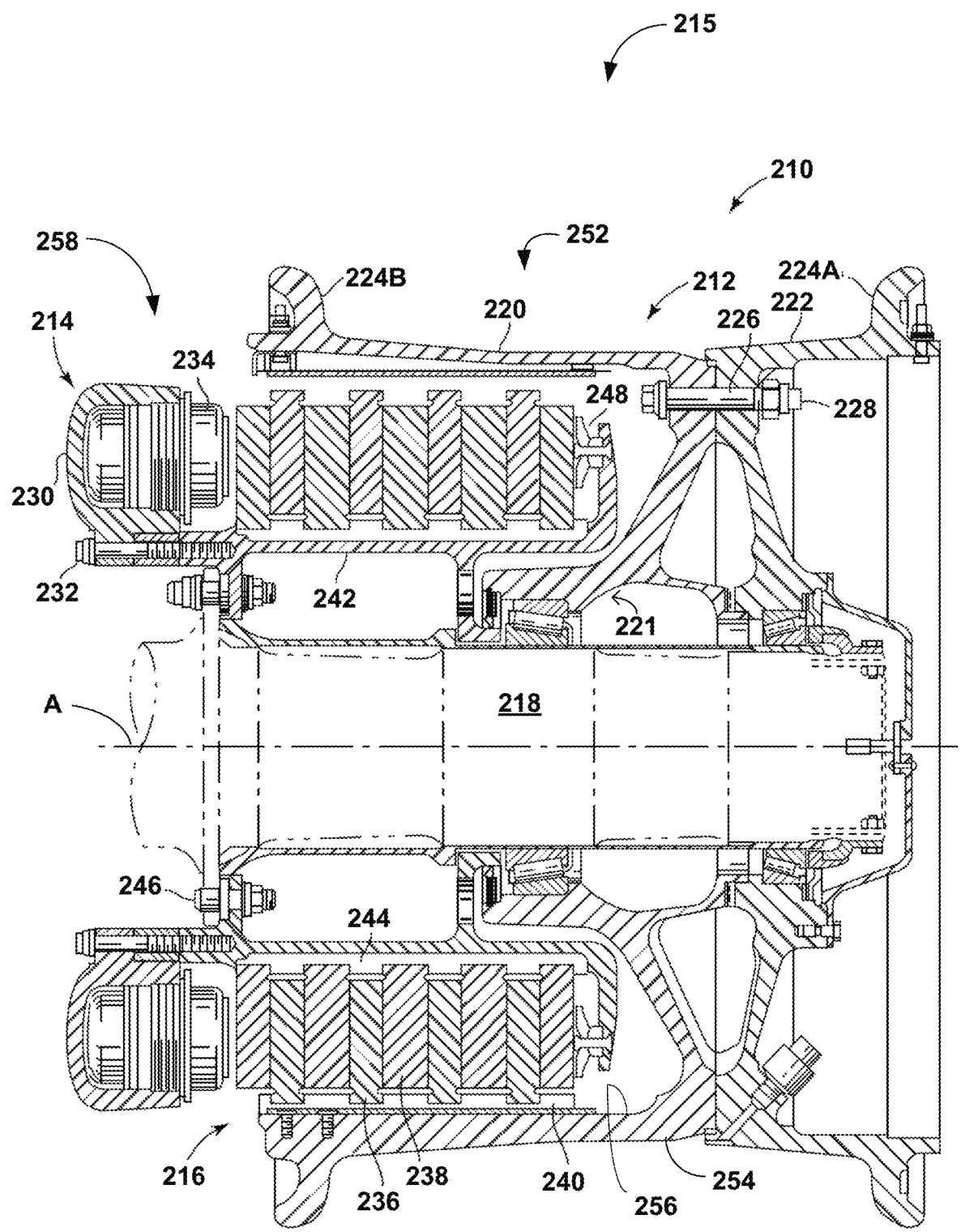
FIG. 2 is a schematic cross-sectional view of an example wheel and brake assembly including the wheel of FIG. 1.

FIG. 2 is a schematic cross-sectional view illustrating an example wheel and brake assembly 215 including a wheel 210 and a braking assembly 258. Wheel and brake assembly 215 is shown and described to provide context to the example drive inserts described here. The drive inserts described herein, however, may be used with any suitable wheel and brake assembly in other examples.

Wheel 210 includes wheel hub 221, tubewell 220, wheel outrigger flange 222, outboard bead seat 224A, and inboard bead seat 224B, rim 252, exterior surface 254, and interior surface 256, which may be configured individually and relation to each other in the same manner as that discussed for the like-named components of wheel 110 (FIG. 1). Wheel 210 may be configured to be rotatably carried on axle 218. In turn, wheel 210 may impart motion to a vehicle including or mounted on the wheel and brake assembly 215. In the example shown in FIG. 2, tubewell 220 and wheel outrigger flange 222 are mechanically coupled by lug bolt 226 and lug nut 228. Other connection techniques may be used in other examples.

Braking assembly 258 includes an actuator assembly 214 and a brake stack 216. Actuator assembly 214 includes actuator housing 230, actuator housing bolt 232, and ram 234. Brake stack 216 includes interleaved rotor brake discs 236 and stator brake discs 238. Rotor brake discs 236 are configured to move relative to stator brake discs 238, e.g., rotationally about axis A and axially along axis A relative to stator brake discs 238. Rotor brake discs 236 are engaged (e.g. interface) with wheel 210, and in particular tubewell 220, by rotor drive keys 240. Stator brake discs 238 are mounted to torque tube 242 by splines 244. Wheel and brake assembly 215 may support any variety of private, commercial, or military aircraft or other type of vehicle.

Wheel and brake assembly 215 may be mounted to a vehicle via torque tube 242 and axle 218. In the example of FIG. 2, torque tube 242 is affixed to axle 218 by a plurality of bolts 246. Torque tube 242 supports actuator assembly 214 and stator brake discs 238. Axle 218 may be mounted on a strut of a landing gear (not shown) or other suitable component of the vehicle to connect wheel and brake assembly 215 to the vehicle.

During operation of the vehicle, braking may be necessary from time to time, such as during landing and taxiing procedures of an aircraft. Wheel and brake assembly 215 is configured to provide a braking function to the vehicle via actuator assembly 214 and brake stack 216. Actuator assembly 214 includes actuator housing 230 and ram 234. Actuator assembly 214 may include different types of actuators such as one or more of, e.g., an electrical-mechanical actuator, a hydraulic actuator, a pneumatic actuator, or the like. During operation, ram 234 may extend away from actuator housing 230 to axially compress brake stack 216 against compression region 248 for braking. Brake stack 216 includes interleaved rotor brake discs 236 and stator brake discs 238.

Rotor brake discs 236 are slidably engaged with rotor drive keys 240 for common rotation with tubewell 220 and rotor drive keys 240. Stator brake discs 238 are mounted to torque tube 242 by splines 244. In the example of FIG. 2, brake stack 216 includes four rotors and five stators. However, a different number of rotors and/or stators may be included in brake stack 216 in other examples. Rotor brake discs 236 and stator brake discs 238 may provide opposing friction surfaces for braking an aircraft. In some examples, wheel and brake assembly 215 may include a thermal barrier between rotor brake discs 236 and tubewell 220 in order to, for example, limit thermal transfer between brake stack 216 and wheel 210.

In some examples, splines 244 may be circumferentially spaced about an outer portion of torque tube 242. Stator brake discs 238 may include a plurality of radially inwardly disposed lug notches along an inner diameter of the brake disc configured to engage with splines 244. Similarly, rotor brake discs 236 may include a plurality of radially inwardly disposed drive slots along an outer periphery (e.g., an outer diameter in the case of a disc having a circular cross-section) of the rotor brake disc. The drive slots may be configured to engage with rotor drive keys 240. As such, rotor brake discs 236 will rotate with the motion of wheel 210 while stator brake discs 238 remain stationary, allowing the friction surfaces of an adjacent stator brake disc 238 and rotor brake disc 236 to engage with one another to deaccelerate the rotation of wheel 210.

Figure 3:
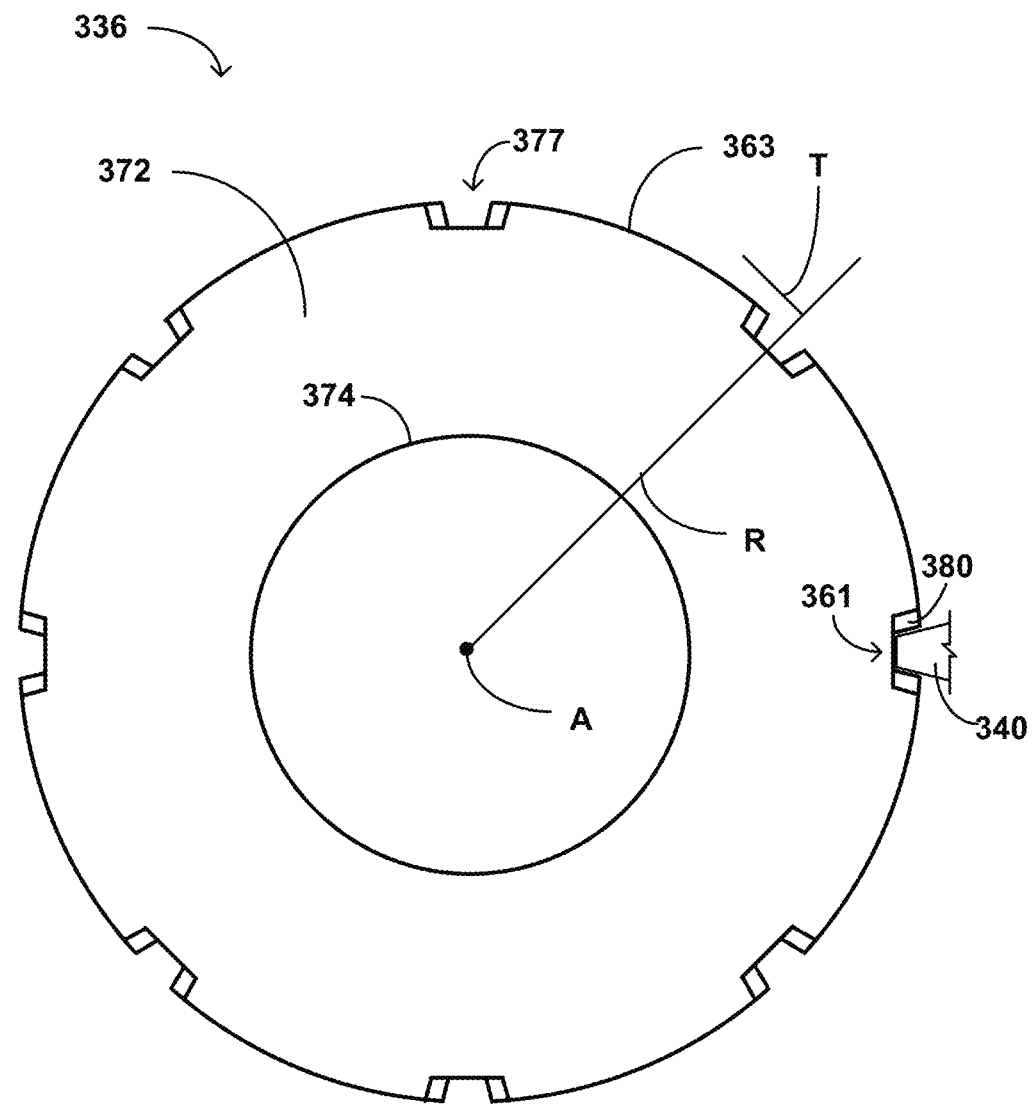
FIG. 3 is a plan view illustrating an example brake disc having a plurality of drive slots.

FIG. 3 is a diagram illustrating an example rotor brake disc 336, which may be an example of one or more of rotor brake discs 236 (FIG. 2). Rotor brake disc 336 can be formed from any suitable material, such as, but not limited to a carbon-carbon composite. Rotor brake disc 336 defines a central aperture 374 extending through rotor brake disc 336. Rotor brake disc 336 further defines a plurality of drive slots around an outer perimeter 363 of rotor brake disc 336. The plurality of drive slots comprises, for example, drive slot 361 and drive slot 377, as well as others similarly depicted. Rotor brake disc 336 further includes friction surface 372. Rotor brake disc 336 may include a second friction surface (not shown) opposite friction surface 372. Friction surface 372 and the second friction surface of brake disc 336 are configured to engage with adjacent stator discs during a braking operation of a brake assembly including a brake disc stack, of which disc 336 is part.

Central aperture 374 may be configured to surround an axle such as axle 218 and allow rotation of rotor brake disc 336 around and relative to the axle (FIG. 2). For example, central aperture 374 may be configured to receive torque tube 242, surrounding and affixed to axle 218 by bolts 246. The plurality of drive slots such as 361, 377 may be configured to slidably engage a plurality of rotor drive keys, such as the plurality of rotor drive keys 140, 240 (FIGS. 1 and 2). As discussed, each rotor drive key of the plurality of rotor drive keys 140, 240 may extend in a substantially axial direction of wheel 110, 210 (e.g., parallel to axis of rotation A shown in FIG. 3) and may be mounted around interior surface 156, 256 of wheel 110, 210 (FIG. 1, 2). When the plurality of drive slots slidably engages a plurality of rotor drive keys, such as plurality of rotor drive keys 140, 240, and central aperture 374 surrounds an axle such as axle 218, rotor brake disc 336 is configured to receive a force from the plurality of rotor drive keys which acts tangentially on rotor disk 336 and generates substantially synchronous rotation of rotor disk 336 with a wheel such as wheel 110, 210 (FIG. 1, 2).

For example, FIG. 3 illustrates a portion of a rotor drive key 340 extending through drive slot 361. Rotor drive key 340 may be a rotor drive key within the plurality of rotor drive keys 140, 240 (FIGS. 1 and 2). Drive slot 361 is configured to slidably engage rotor drive key 340 in an axial direction of rotor brake disc 336. One or more of the drive slots (e.g., a subset of the drive slots or all of the drive slots) defined by rotor brake disc 336 may have a portion of a respective rotor drive key extending through the drive slot in a manner similar to that depicted for drive slot 361 and rotor drive key 340. Rotor drive key 340 may extend in a substantially axial direction of a wheel such as wheel 210, 110 (FIGS. 1 and 2) and be mounted around an interior surface such as interior surface 156, 256 of wheel 110, 210, such that when the wheel rotates around an axle, such as axle 218, rotor drive key 340 correspondingly rotates around the axle. The rotation of rotor drive key 340 causes rotor drive key 340 to impart a force acting tangentially on rotor brake disc 336, generating substantially synchronous rotation of rotor disk 336 with the wheel.

During a braking operation, as wheel 210 rotates relative to axle 218, when a ram such as ram 234 compresses a brake stack such as brake stack 216 (FIG. 2), rotor brake disc 336 of brake stack 216 may slidably translate over a plurality of rotor drive keys in an axial direction substantially parallel (e.g., parallel or nearly parallel to the extent permitted by manufacturing tolerances) to the axis A extending through central aperture 374. The axial translation of rotor brake disc 336 may bring friction surface 372 of rotor brake disc 336 into contact with a friction surface of one or more adjacent stator brake discs. As discussed, stator brake discs such as stator brake discs 238 may be mounted to torque tube 242 by splines 244 (FIG. 2), and may be rotationally stationary with respect to axle 218. Consequently, when rotor brake disc 336 is rotating with respect to an axle such as axle 218 (e.g., wheel 210 is turning) and rotor brake disc 336 is axially translated such that friction surface 372 contacts the friction surface of an adjacent stator brake disc, the plurality of rotor drive keys may impart a force on the plurality of drive slots such as drive slots 361, 378 as the frictional contact converts kinetic energy to thermal energy. For example, during the braking operation, the plurality of rotor drive keys may impart a force on the plurality of drive slots in a substantially tangential direction of rotor brake disc 336 as friction surface 372 engages a friction surface of an adjacent stator brake disc, when a wheel such as wheel 210 is experiencing rotation relative to an axle such as axle 218. The force imparted by the plurality of rotor drive keys such as drive key 340 on the plurality of drive slots such as drive slots 361, 378 may be an action force or a reaction force.

Here and elsewhere, an axial direction of a brake disc means the direction of a vector coincident with an axis extending through a central aperture of the rotor brake disc. For example, FIG. 3 illustrates an axis A perpendicular to the page and extending through central aperture 374. An axial direction of rotor brake disc 336 is the direction of a vector coincident with axis A. Axis A of FIG. 3 may correspond to axis A of FIG. 1 and/or FIG. 2. A radial direction of a brake disc means the direction of a vector coincident with a line perpendicular to and intersecting the axis extending through the central aperture, and intersecting the outer perimeter of the brake disc. For example, FIG. 3 illustrates a line R perpendicular to and intersecting axis A extending through central aperture 374, and intersecting outer perimeter 363 of rotor brake disc 336. A radial direction of rotor brake disc 336 is the direction of a vector coincident with line R. A tangential direction of a brake disc means the direction of a vector coincident with a line perpendicular to the axial direction of the brake disc and perpendicular to the radial direction of the brake disc. For example, FIG. 3 illustrates a line T perpendicular to axis A extending through central aperture 374 and perpendicular to line R. A tangential direction of rotor brake disc 336 is the direction of a vector coincident with line T.

Each of the plurality of drive slots, including slots 361, 377, in rotor brake disc 336 may be reinforced by a drive insert, such as drive insert 380 within drive slot 361. While drive insert 380 and drive slot 361 are primarily referred to in the description of FIG. 3 as well as other figures, the description of drive insert 380 and drive slot 361 may apply to the other drive slots and drive inserts of rotor brake disc 336 and other brake discs described herein. Additionally, while rotor brake disc 336 is primarily referred to in the description of FIG. 3 as well as other figures, the drive inserts described herein may also be utilized on a drive slot of a stator brake disc, such as one or more of stator brake discs 238 (FIG. 2).

Drive insert 380 is configured to help relieve the effect of stresses imparted to drive slot 361 from rotor drive key 340 during a braking operation. Drive insert 380 provides a sliding and a bearing surface to act against rotor drive key 340, and, thus, may minimize or even eliminate the extent to which rotor drive key 340 engages directly with a surface of rotor brake disc 336. Drive insert 380 is configured to substantially cover certain areas (e.g., all or part) of drive slot 361 and is configured to install on rotor brake disc 336 such that drive insert 380 is between rotor drive key 340 and drive slot 361 when rotor drive key 340 imparts tangential forces to drive slot 361 during braking operations. Drive insert 380 is configured to provide for secure placement within drive slot 361 in the axial, radial, and tangential directions of rotor brake disc 336, in order to maintain a substantially fixed position relative to drive slot 361 as rotor brake disc 336 rotates during rotation of wheel 110 (FIG. 1,2). Drive insert 380 may be configured to provide secure placement in the absence of rivets (e.g., rivetless) or other fastening mechanisms penetrating rotor brake disc 336. The use of drive insert 380 may reduce wear of drive slot 361 as rotor drive key 340 cyclically loads drive slot 361 over repeated braking operations.

FIG. 4 illustrates a section of rotor brake disc 336 and a section of drive slot 361 defined by brake disc 336. Drive slot 361 is on outer perimeter 363 of rotor brake disc 360. Axial, radial, and tangential directions are indicated by line A1, line R1, and line T1, respectively. Line A1, line R1, and line T1 may be parallel to line A, line R, and line T respectively (FIG. 3). Drive slot 361 includes a torque face 364. Torque face 364 may be positioned along outer perimeter 363 of rotor brake disc 336. Torque face 364 defines a portion of drive slot 361 and is configured to bear a tangential force imparted by a rotor drive key (e.g., rotor drive key 340 (FIG. 3)) during a braking operation. In some examples, a projection of torque face 364 onto a plane including the line A1 and the line R1 defines a non-zero displacement in a direction parallel to the line R1.

Torque face 364 may have any suitable orientation relative to the axial A1, radial R1, and tangential directions T1. In some examples, torque face 364 is oriented such that a projection of torque face 364 onto a plane including the line A1 and the line T1 may define a non-zero displacement in a direction parallel to the line T1. In some examples, a vector parallel to torque face 364 may have a slope $\Delta R1/\Delta T1$ of greater than 1, where $\Delta R1$ is the absolute value of a displacement in a direction parallel to R1 and $\Delta T1$ is the absolute value of a displacement in a direction parallel to T1.

FIG. 5 illustrates an example drive insert 380 comprising a retainer 382 and a clip 390. Drive insert 380 is configured to secure within a drive slot of a brake disc, such as drive slot 361 of rotor brake disc 336. Again, while rotor brake disc 336, drive slot 361, and drive key 340 (FIG. 3) are primarily referred to in the description of FIG. 5 as well as other figures, the description of drive insert 380 may apply to the other drive inserts, brake discs, drive slots, and/or drive keys.

Drive insert 380 is configured to install on brake disc 336 such that drive insert 380 is between rotor drive key 340 and drive slot 361 when brake disc 336 is installed on a wheel. Thus, drive insert 380 is between rotor drive key 340 and drive slot 361 when rotor drive key 340 imparts tangential forces to drive slot 361 during braking operations. Drive insert 380 may be configured to reinforce drive slot 361 to help minimize any adverse effects to brake disc 336 from rotor drive key 340 imparting forces to drive slot 361 during a braking operation. Drive insert 380 may be configured to provide for secure placement within drive slot 361 in the axial A, radial R, and tangential T directions of rotor brake disc 336, in order to maintain a substantially fixed position relative to drive slot 361 as rotor brake disc 336 rotates.

Clip 390 is configured to be slidable over a surface of brake disc 336 in a tangential direction T of the rotor brake disc 336, where the surface of the brake disc is adjacent to drive slot 361 on perimeter 363 of brake disc 336. For example, clip 390 may be configured to slide over surface 362 of rotor brake disc 336 in a direction substantially parallel to line T1. As illustrated, surface 362 is adjacent to drive slot 361 in the tangential direction. Retainer 382 is configured to be slidable over clip 390 when clip 390 is positioned over surface 362 (or other surface in other examples). Retainer 382 may be configured to be slidable over clip 390 in a radial direction R of brake disc 336. Retainer 382 may act to secure clip 390 to brake disc 336 in order to minimize axial, radial, and/or tangential movements of clip 390 relative to brake disc 336. For example, when clip 390 is positioned over surface 362, retainer 382 may be configured to slide over clip 390 in direction substantially parallel to R1 in order to secure clip 390 to surface 362 and minimize movements of clip 390 in directions substantially parallel to A1, R1, and T1.

In some examples, retainer 382 comprises a channel 386 configured to receive clip 390 when retainer 382 slides over clip 390 in the radial direction of rotor brake disc 336. Channel 386 may be formed by a first leg 311 and a second leg 313 extending from a bridge section 315. Bridge section 315 may resiliently bias first leg 311 toward second leg 313, and/or resiliently bias second leg 313 toward first leg 311.

In some examples, clip 390 includes a body section 391 comprising a drive face 392 and a back face 393. Drive face 392 and back face 393 are surfaces of body section 391. Back face 393 is opposite drive face 392, such that some portion of body section 391 separates back face 393 and drive face 392. Back face 393 may be configured to engage torque face 364 of brake disc 336 when clip 390 is positioned over surface 362 of brake disc 336.

In addition, in some examples, clip 390 includes a first arm 396 and a second arm 395 extending from body section 391. Retainer 382 may be configured to contact first arm 396 and second arm 395 when retainer 382 is positioned over clip 390.

Figure 6:
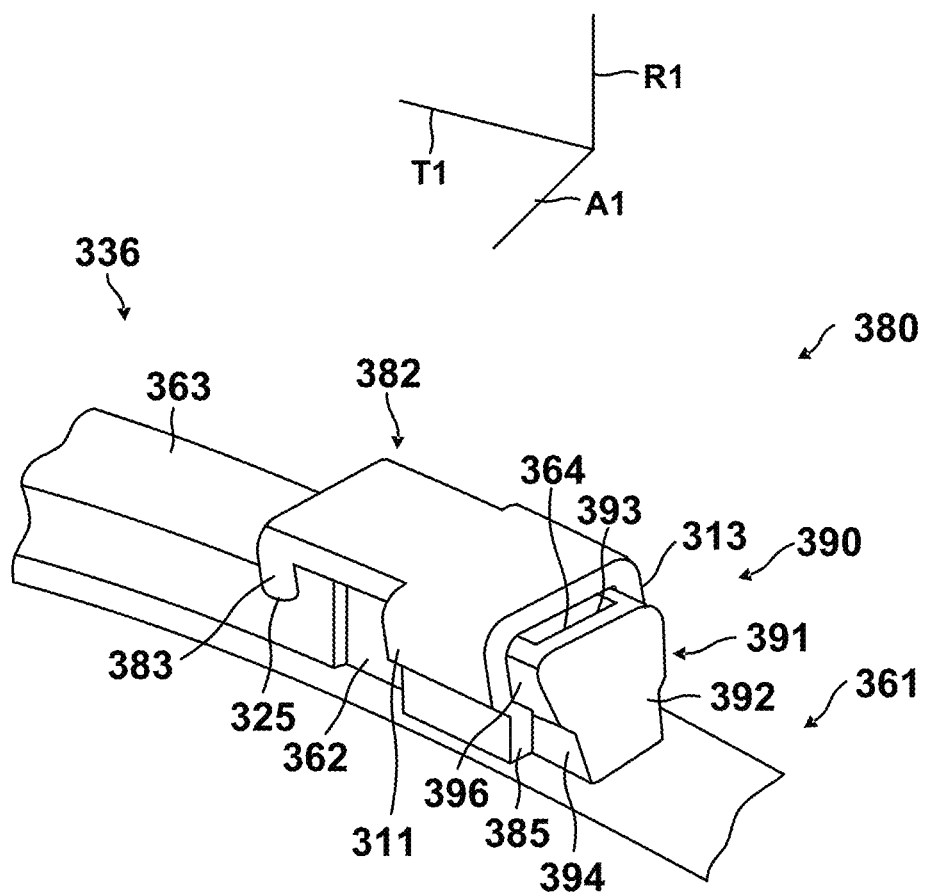
FIG. 6 is an isometric view of an example clip and example retainer installed on a brake disc.

FIG. 6 illustrates an example drive insert 380 positioned on a brake disc 336, which defines perimeter 363 and drive slot 361. Axial, radial, and tangential directions are indicated by line A1, line R1, and line T1, respectively. Line A1, line R1, and line T1 may be parallel to line A, line R, and line T respectively (FIG. 3). Clip 390 of drive insert 380 is configured to be slidable over surface 362 of brake disc 336, and is shown positioned on brake disc 336 such that first arm 396 at least partially covers surface 362 (FIG. 4) and such that body section 391 is engaged with (e.g., directly or indirectly contacting) brake disc 336. In some examples, there may be a gap between body section 391 and brake disc 336 when first arm 396 at least partially covers surface 362. With clip 390 positioned over surface 362 of brake disc 336, back face 393 is engaging torque face 364 of brake disc 336. Retainer 382 is positioned over clip 390 and contacting first arm 396 and second arm 395 of clip 390. As positioned, retainer 382 and clip 390 provide for secure placement of drive insert 380 within drive slot 361 of brake disc 336 in the axial, radial, and tangential directions of rotor brake disc 336. Further, drive insert 380 is installed such that drive insert 380 may be between rotor drive key 340 (FIG. 3) and drive slot 361 when rotor brake disc 336 is installed on a wheel including rotor drive key 340.

Drive face 392 and back face 393 (FIG. 5, 6) of clip 390 may be non-intersecting surfaces of body section 391. Back face 393 is opposite drive face 392, such that some portion of body section 391 separates back face 393 and drive face 392. In some examples, back face 393 is configured to frictionally engage torque face 364 of brake disc 336 when clip 390 is positioned over surface 362 of brake disc 336 as designed. Back face 393 may be configured to substantially conform to torque face 364 when clip 390 is positioned over surface 362. Torque face 364 may define a torque face surface area and back face 393 may defines a back face surface area. In some examples, when clip 390 is positioned over surface 362, back face 393 may contact at least 70% of the torque face surface area, in other examples, at least 80%, and in other examples, at least 90%, such as 100% or nearly 100% to the extent permitted by manufacturing tolerances.

Back face 393 may have any suitable orientation relative to the axial A1, radial R1, and tangential directions T1 of rotor brake disc 336. In some examples, when clip 390 is positioned over surface 362, back face 393 is oriented such that a projection of back face 393 onto a plane including the line A1 and the line T1 may define a non-zero displacement in a direction parallel to the line T1. In some examples, when clip 390 is positioned over surface 362, a vector parallel to back face 393 may have a slope $\Delta R1/\Delta T1$ of greater than 1, where $\Delta R1$ is the absolute value of a displacement in a direction parallel to R1 and $\Delta T1$ is the absolute value of a displacement in a direction parallel to T1.

First arm 396 is configured to engage surface 362 of rotor brake disc 336 when back face 393 of body section 391 engages torque face 364 of drive slot 361. Second arm 395 is configured to engage second surface 365 of rotor brake disc 336 when back face 393 engages torque face 364. The surface 362 engaged by first arm 396 may comprise a first side of rotor brake disc 336 and the second surface 365 engaged by second arm 395 may comprise another side of rotor brake disc 336 opposite the first side. Surface 362 and second surface 365 may be non-intersecting surfaces of rotor brake disc 336. Surface 362 and second surface 365 may be separated by perimeter 363 and/or some portion of rotor brake disc 336. In some examples, clip 390 may be configured so that first arm 396 substantially conforms to surface 362 when clip 390 is positioned over surface 362. Clip 390 may be configured so that second arm 395 substantially conforms to second surface 365 when clip 390 is positioned over surface 362. First arm 396 and second arm 395 may contact surface 362 and second surface 365 respectively when clip 390 is positioned over surface 362. Clip 390 may be configured so that first arm 396 and second arm 395 slant away from each other when clip 390 is positioned over surface 362.

Clip 390 can have any suitable configuration. In some examples, body section 391 and arms 395, 396 are formed to be physically separate from each other and subsequently attached to define clip 390. In other examples, body section 391 and arms 395, 396 have a unitary body construction, e.g., are formed to be one piece. Clip 390 may be formed by machining out of bar stock, investment casting, 3D printing, or some other suitable method. Further, in some examples, clip 390 can be formed from any suitable materials, such as, but not limited to, Inconel or other alloys. In some examples, section 391 and arms 395, 396 are formed from the same material, while in other examples, at least two of section 391, arm 395, and arm 396 are formed from different materials from each other.

Figure 7B:
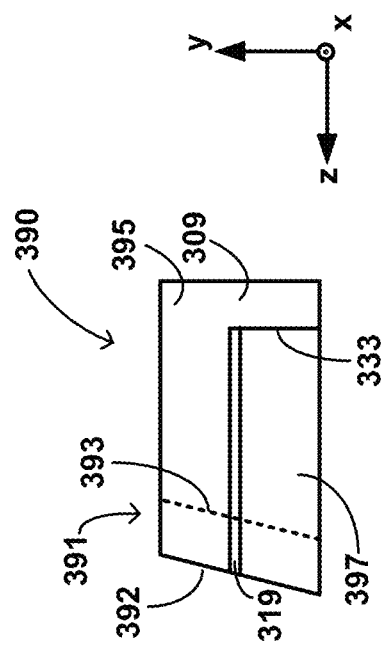
FIG. 7B is a side view illustrating the example clip of the drive insert of FIG. 7A.
Figure 7C:
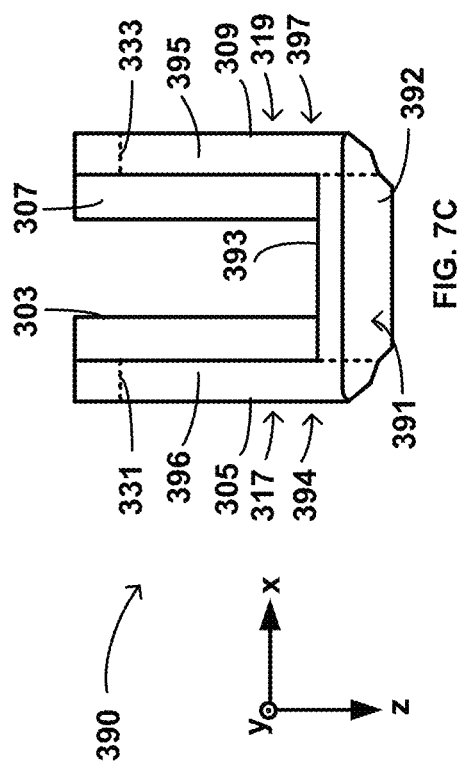
FIG. 7C is a top view illustrating the example clip of the drive insert of FIG. 7A.
Figure 7A:
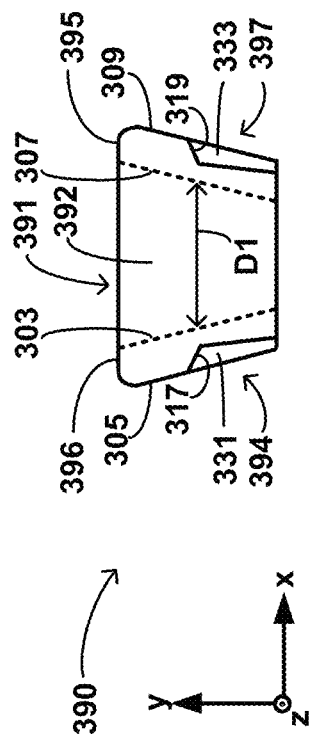
FIG. 7A is a front view illustrating an example clip of a drive insert.

FIGS. 7A-7C illustrate plan views of an example clip 390. FIG. 7A illustrates a front view, FIG. 7B illustrates a side view, and FIG. 7C illustrates a top view. The x-y-z axes illustrated in each of FIGS. 7A, 7B, and 7C maintain the same orientation with respect to clip 390 in each view provided. Clip 390 includes body section 391, which defines drive face 392. Clip 390 further comprises first arm 396 and second arm 395 extending from body section 391. Clip 390 includes back face 393 opposite drive face 392, such that some portion of body section 391 separates back face 393 and drive face 392.

First arm 396 includes a first arm interior wall 303 and a first arm exterior wall 305, with first arm interior wall 303 and first arm exterior wall 305 on substantially opposite sides of first arm 396. Second arm 395 includes a second arm interior wall 307 and a second arm exterior wall 309, with second arm interior wall 307 and second arm exterior wall 309 on substantially opposite sides of second arm 395. First arm interior wall 303 and second arm interior wall 307 may generally face each other, while first arm exterior wall 305 and second arm exterior wall 309 may generally face away from each other. Clip 390 defines a gap between first arm interior wall 303 and second arm interior wall 307 that is configured to receive a part of brake disc 336, e.g., mate with a part of brake disc 336 adjacent to drive slot 361 ((FIG. 3). The gap is defined by a displacement D1 between first arm interior wall 303 and second arm interior wall 307. The displacement D1 may be parallel to the x axis, and may vary with respect to the y axis. For example, the displacement D1 may increase in a positive direction of the y axis and decrease in a negative direction of the y axis, such that first arm interior wall 303 and second arm interior wall 307 generally slant away from each other in a positive direction of the y axis. Displacement D1 may decrease and/or remain substantially constant in a positive direction of the y axis.

In some examples, clip 390 is configured such that the displacement D1 between first arm interior wall 303 and second arm interior wall 307 varies in the same manner as a displacement D2 (FIG. 4) between surface 362 and second surface 365 of rotor brake disc 336, which can help facilitate the achievement of a desirable level of physical engagement between clip 390 and brake disc 336. For example, the displacement D1 may increase in a positive direction of they axis, and the displacement D2 may increase in a radial direction of rotor brake disc 336 from central aperture 374 to perimeter 363 (FIG. 3). The displacement D2 may be proximate drive slot 361 and may extend between surface 362 and second surface 365 in a tangential direction of rotor brake disc 336. Clip 390 may be configured such that a varying displacement D1 between first arm interior wall 303 and second arm interior wall 307 dovetails with the varying displacement D2 of rotor brake disc 336. The displacement D1 may increase in a positive direction of the y axis such that, when clip 390 is positioned over surface 362, the increasing displacement D1 between first arm 396 and second arm 395 substantially secures clip 390 against movement in a radial direction of rotor brake disc 336. In an example, when clip 390 is positioned over surface 362, the displacement D1 increases in a radial direction from central aperture 374 of rotor brake disc 336 to perimeter 363 of rotor brake disc 336.

Clip 390 may be configured such that when clip 390 is positioned over surface 362, first arm interior wall 303 contacts surface 362 and second arm interior wall 307 contacts second surface 365 (FIG. 4). For example, clip 390 may be configured such that when back face 393 engages torque face 364 of rotor brake disc 336, first arm interior wall 303 is positioned over surface 362 and second arm interior wall 307 is positioned over second surface 365. Clip 390 can be positioned over brake disc 336 using any suitable technique. For example, clip 390 may be configured such that to position clip 390 over surface 362, first arm interior wall 303 is slid over surface 362 and second arm interior wall 307 is slid over second surface 365, e.g., in the tangential direction T1. Clip 390 may be configured such that when back face 393 engages torque face 364 of rotor brake disc 336, the displacement D1 increases in a radial direction from central aperture 374 to perimeter 363 of rotor brake disc 336.

As discussed, drive insert 380 includes a clip such as clip 390 and a retainer such as retainer 382. Clip 390 is slidable over a surface adjacent to the drive slot of a brake disk, such as surface 362 adjacent to drive slot 361 of rotor brake disc 336 (FIG. 4). Clip 390 is configured to slide over surface 362 in a tangential direction T1 of rotor brake disc 336, and may be configured to substantially trap clip 390 against movements in the axial A1 and radial R1 directions when positioned on rotor brake disc 336. For example, clip 390 may comprise first arm 396 and second arm 395 configured to engage opposite sides of rotor brake disc 336 (e.g., surface 362 and second surface 365) and substantially trap clip 390 against movements in the axial direction A1 of rotor brake disc 336. An increasing displacement D1 between first arm 396 and the second arm 395 may substantially dovetail with rotor brake disc 336, and substantially trap clip 390 against movements in the radial direction R1 of rotor brake disc. The support provided by clip 390 against axial and radial movements when positioned on rotor brake disc 336 may be present in the absence of an additional attachment mechanism such as rivet. Thus, clip 390 may provide support against the axial A1 and radial R1 movements when installed on rotor brake disc 336 without the necessity of an extra attachment device (e.g., a rivet) penetrating clip 390 and/or rotor brake disc 336.

To provide further support, retainer 382 is slidable over clip 390 when clip 390 is positioned over surface 362 (or other surface in other examples). Retainer 382 may be slidable over clip 390 in a radial direction of rotor brake disc 336. In examples, clip 390 may be configured to slide tangentially between retainer 382 and surface 362. Retainer 382 may be configured to provide support to clip 390 against movements in the tangential direction T1 when retainer 382 is positioned on clip 390. For example, retainer 382 may include a flange 383 (FIG. 5) which inserts into a cut 325 (FIG. 4) of rotor brake disc 336 when retainer 382 positions on clip 390, substantially trapping retainer 382 against movements in the tangential direction T1 of rotor brake disc 336. When positioned, retainer 382 may be configured to oppose tangential movements of clip 390 by, for example, providing surfaces which substantially prevent clip 390 from translating in the tangential direction T1. Thus retainer 382 may act to trap clip 390 against movements in the tangential direction T1.

Correspondingly, clip 390 and retainer 382 act together to substantially trap drive insert 380 against movements in the axial, radial, and tangential direction rotor brake disc 336 when drive insert 380 is installed on rotor brake disc 336. Further, clip 390 and retainer 382 act together to secure drive insert 380 to the brake disc without requiring a fastener (e.g., a rivet) or other element to penetrate drive insert 380 and rotor brake disc 336. This potentially avoids rivet failure and compromise of the attachment between the drive insert and the brake disc, as well as the presence of loose hardware floating within the brake system.

Retainer 382 may engage clip 390 in any suitable manner when retainer 382 is positioned on clip 390. In examples, first leg 311 and second leg 313 are resiliently biased to provide an inward clamping action against clip 390 when retainer 382 is positioned and/or radially urged over clip 390. In some examples, the first leg 311 and second leg 313 include individual tabs which respectively insert into first arm 396 and second arm 395 of clip 390. In examples, clip 390 and retainer 382 may be attached using a snap-fit, interference fit, a press fit, or other fit, and may be welded, soldered, and/or attached using a fastener which penetrates retainer 382 and/or clip 390.

In some examples, first and second arms 396, 395 may define slots that are configured to receive and mate with (e.g., via interference fit) a part of retainer 382, and/or may define protrusions that are configured to receive and mate with slots defined by retainer 382. For example, first arm 396 may define a first slot 394 (FIGS. 5, FIGS. 7A-7C). First slot 394 is defined by a portion of first arm exterior wall 305 (FIGS. 7A-7C) and, in particular, may be defined at least in part by a first retaining surface 317 of first arm exterior wall 305, with first retaining surface 317 having a non-zero displacement along the x axis. First retaining surface 317 may be configured such that, when clip 390 is positioned over surface 362 of brake disc 336, first retaining surface 317 has a non-zero displacement in the axial direction of rotor brake disc 336 (FIG. 3, 4).

In some examples, second arm 395 defines a similar slot, e.g., second slot 397, which can be defined at least in part by a second retaining surface 319 of second arm exterior wall 309. Second retaining surface 319 has a non-zero displacement along the x axis. Second retaining surface 319 may be configured such that when clip 390 is positioned over surface 362 of brake disc 336, second retaining surface 319 has a non-zero displacement in the axial direction of rotor brake disc 336 (FIG. 3, 4). First slot 394 and second slot 397 may extend in the z direction either partially or completely over the first arm 396 and second arm 395, respectively. First slot 394 and second slot 397 may have any appropriate depth in the x direction within first arm 396 and second arm 395 respectively. For example, first slot 394 and second slot 397 may have a depth in the x direction such that some portion of first slot 394 and second slot 397 frictionally engage with some portion of retainer 382 when retainer 382 is positioned over clip 390. First slot 394 and second slot 397 may be configured to receive some portion of retainer 382 (e.g., first tab 385 and second tab 384) when retainer 382 slides over and surrounds clip 390, as described in further detail below.

Retainer 382 is configured to fit over clip 390 when clip 390 is positioned over brake disc 336 to help secure clip 390 to brake disc. As depicted at FIG. 5, retainer 382 may define a channel 386 configured to receive a portion of clip 390 when retainer 382 is positioned over clip 390. Retainer 382 may be configured to contact at least some portion of first arm 396 and at least some portion of second arm 395 when channel 386 receives the portion of clip 390. Channel 386 includes a first open end 335 and a second open end 337, where first open end 335 and second open end 337 are in fluid communication through channel 386. Channel 386 may be at least partially defined by a first leg 311 and a second leg 313.

First leg 311 and second leg 313 may be connected by a bridge section 315. Bridge section 315 may provide resilient biasing to first leg 311 and/or second leg 313. The resilient biasing provided by bridge section 315 may result in, for example, a tendency of first leg 311 and second leg 313 to return or attempt to return to an initial spacing when first leg 311 and/or second leg 313 is displaced from a resting, substantially zero-stress position. This resilient biasing may enable retainer 382 to be urged over clip 390 such that first leg 311 and second leg 313 provide contact pressure to clip 390 to assist with securing drive insert 380 relative to rotor brake disc 336 in the radial, tangential, and/or axial directions of rotor brake disc 336.

Figure 8B:
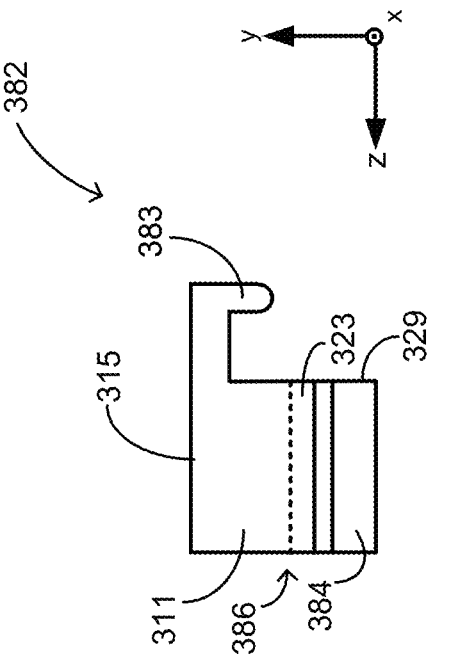
FIG. 8B is a side view illustrating the example retainer of the drive insert of FIG. 8A.
Figure 8C:
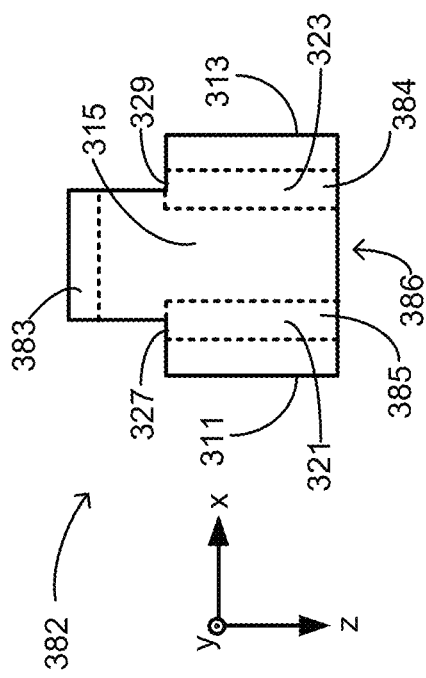
FIG. 8C is a top view illustrating the example retainer of the drive insert of FIG. 8A.
Figure 8A:
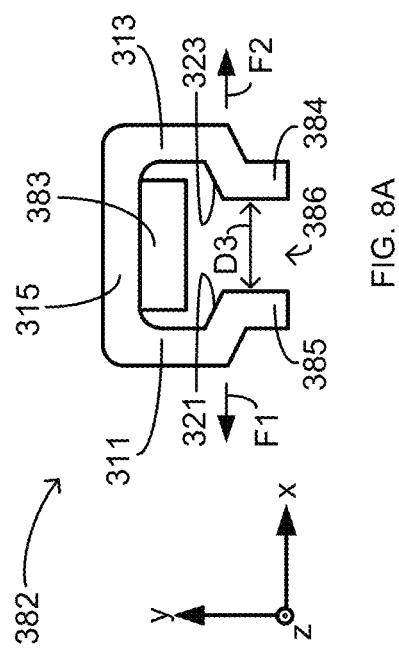
FIG. 8A is a front view illustrating an example retainer of a drive insert.

FIGS. 8A-8C illustrate plan views of an example retainer 382. FIG. 8A illustrates a front view, FIG. 8B illustrates a side view, and FIG. 8C illustrates a top view. The x-y-z axes illustrated in each of FIGS. 8A, 8B, and 8C maintain the same orientation with respect to retainer 382 in each view provided. Retainer 382 comprises first leg 311 and second leg 313 connected by bridge section 315. When first leg 311, second leg 313, and bridge section 315 are in a resting, substantially zero-stress position, first leg 311 and second leg 313 maintain a displacement D3. In some examples, bridge section 315 provides resilient biasing to first leg 311 which generates a tendency of first leg 311 to return or attempt to return to a position establishing the displacement D3 when the first leg 311 is temporarily displaced by a force F1 acting on first leg 311 in the direction shown at FIG. 8A. In addition or instead, in some examples, bridge section 315 provides resilient biasing to second leg 313 which generates a tendency of second leg 313 to return or attempt to return to a position establishing the displacement D3 when the second leg 313 is temporarily displaced by a force F2 acting on second leg 313 in the direction shown at FIG. 8A. The resilient biasing may provide a gripping force and/or inward clamping force onto clip 390 when retainer 382 slides over clip 390 and contacts some portion of first arm 396 and some portion of second arm 395 of clip 390.

As discussed above, in some examples, retainer 382 and clip 390 can include mating features that help to engage retainer 382 and clip 390 and fix a position of retainer 382 and clip 390. In some examples in which clip 390 defines first slot 394 and second slot 397 (FIGS. 5 and 7A-7C), retainer 382 may comprise a first tab 385 and a second tab 384 configured to engage with respective slots 394, 397. First tab 385 can be defined by or coupled to first leg 311 and second tab 384 can be defined by or coupled to second leg 313. First leg 311 may bias first tab 385 and second leg 313 may bias second tab 384 to maintain the displacement D3 between first tab 385 and second tab 384. First tab 385 is configured to insert into first slot 394 of clip 390 when retainer 382 is positioned over clip 390, and second tab 384 is configured to insert into in second slot 397 of clip 390 when retainer 382 is positioned over clip 390.

FIG. 6 illustrates retainer 382 positioned over and partially surrounding clip 390, with first tab 385 of retainer 382 inserted within first slot 394 of clip 390. Though not illustrated at FIG. 6, second tab 384 of retainer 382 may be inserted within second slot 397 of clip 390 in like manner. First tab 385 and second tab 384 are also illustrated in FIG. 5. In some examples, first tab 385 may be configured to insert into first slot 394 with a snap fit, such that some portion of first tab 385 interlocks with some portion of first slot 394 when first tab 385 inserts into the first slot 394. In some examples, first tab 385 may be configured to insert into first slot 394 with any suitable type of fit, such as, but not limited to, an interference fit, a press fit, or other fit, and may be welded, soldered, and/or attached using a fastener which penetrates retainer 382 and/or clip 390. The interlocking snap-fit may assist in trapping clip 390 and retainer 382 against movements in the axial, radial, and tangential directions of rotor brake disc 336 when drive insert 380 is installed on rotor brake disc 336.

In an example, displacement D3 is the displacement between first tab 385 and second tab 384 when retainer 382 is in a resting state, and displacement D3 is less than a displacement between first tab 385 and second tab 384 when retainer 382 is positioned over clip 390, such that the resilient biasing of first leg 311 and/or second leg 313 generates an inward clamping force on clip 390 when retainer 382 is positioned over clip 390. The inward clamping force may cause first tab 385 to press on some portion of first slot 394 in a direction opposite the force F1 and/or cause second tab 384 to press on some portion of second slot 397 in a direction opposite the force F2.

First tab 385 may comprise a first bearing surface 321. First bearing surface 321 has an orientation which opposes first retaining surface 317 of first slot 394 (FIGS. 7A-7C), such that when retainer 382 is positioned over clip 390 and clip 390 is positioned over surface 362 of rotor brake disc 336, retainer 382 is resistant to forces seeking to translate retainer 382 in a radial direction R of rotor brake disc 336 (FIG. 3,4). As illustrated at FIGS. 8A-8C, first bearing surface 321 has a non-zero displacement along the x axis. The non-zero displacement along the x axis of first bearing surface 321 enables retainer 382 to radially secure clip 390 by virtue of the non-zero displacement along the x axis of first retaining surface 317 of clip 390. Further, second tab 384 may comprise a second bearing surface 323 having an orientation which opposes second retaining surface 319 of second slot 397 (FIGS. 7A-7C). As illustrated at FIGS. 8A-8C, second bearing surface 323 has a non-zero displacement along the x axis. The non-zero displacement along the x axis of second bearing surface 323 allows retainer 382 to radially secure clip 390 by virtue of the non-zero displacement along the x axis of second retaining surface 319 of clip 390.

In examples, the resilient biasing of bridge section 315 seeks to maintain the displacement D3 between first tab 385 and second tab 384, and maintains first tab 385 positioned within first slot 394 and second tab 384 positioned within second slot 397 of clip 390 when retainer 382 is positioned over clip 390 (FIG. 7A-7C, 8A-8C). These positions maintain first bearing surface 321 in opposition to first retaining surface 317 of first slot 394 and second bearing surface 323 in opposition to second retaining surface 319 of second slot 397. This effectively enables clip 390 to provide a measure of radial support to retainer 382 when clip 390 is positioned over surface 362 of brake disc 336. For example and as discussed, clip 390 may be secured against radial movements by the displacement D1 between first arm interior wall 303 and second arm interior wall 307 (FIG. 7A) providing a dovetail with the displacement D2 between surface 362 and second surface 365 of rotor brake disc 336 (FIG. 4). When the resilient biasing of bridge section 315 positions first tab 385 within first slot 394 to maintain first bearing surface 321 in opposition to first retaining surface 317, the dovetailing may likewise provide a measure of radial support to retainer 382, as first retaining surface 317 may then provide a reaction force to any force acting on retainer 382 in a radial direction of rotor brake disc 336. The opposition of second bearing surface 323 to second retaining surface 319 may operate in similar manner.

First tab 385 and second tab 384 may extend in the z direction either partially or completely over the first leg 311 and second leg 313 respectively. First tab 385 and second tab 384 may have any appropriate width in the x direction. In some examples, first tab 385 comprises a first back surface 327 (FIG. 5, FIG. 8A-8C). First tab 385 may extend in the z direction such that first back surface 327 engages a bearing surface 331 (FIGS. 7A-7C) of first slot 394 when retainer 382 is positioned over clip 390. In a similar manner, second tab 384 may extend in the z direction such that a second back surface 329 of second tab 384 engages a bearing surface 333 (FIGS. 7A-7C) of second slot 397 when retainer 382 is positioned over clip 390. In this manner, retainer 382 may oppose tangential movements of clip 390 by providing surfaces which substantially prevent clip 390 from independently translating in a tangential direction T1 of rotor brake disc 336 (FIG. 4). Thus retainer 382 may act to trap clip 390 against movements in the tangential direction T1.

Retainer 382 may be configured to provide a surface or protrusion which directly interacts with and/or frictionally engages rotor brake disc 336 in order to secure clip 390 and/or retainer 382 against movements in a tangential direction of rotor brake disc 336. The surface or protrusion may oppose tangential movements of retainer 382 relative to rotor brake disc 336 when retainer 382 is positioned on clip 390. For example, retainer 382 may include a flange 383 (FIG. 5) which inserts into a cut 325 (FIG. 4) of rotor brake disc 336 when retainer 382 positions on clip 390, substantially trapping retainer 382 against movements in the tangential direction T1 of rotor brake disc 336. For example, retainer 382 may further comprise a flange 383 (FIG. 5, FIG. 8A-8C). Flange 383 has a non-zero displacement at least along the y axis. Flange 383 may have a greater displacement along the y axis than bridge section 315, so that flange 383 comprises a protrusion. Flange 383 may be configured to extend in an axial direction and a radial direction of rotor brake disc 336 when clip 390 is positioned over surface 362 and retainer 382 is positioned over clip 390. Flange 383 may be configured to insert into a cut 325 defined by rotor brake disc 336 (FIG. 4).

In examples, the non-zero displacement of flange 383 along the y axis acts in opposition to a non-zero displacement of cut 325 in a radial direction of rotor brake disc 336, such that, when clip 390 is positioned over surface 362 and retainer 382 is positioned over clip 390, cut 325 acts in opposition to forces acting on retainer 382 in a tangential direction of rotor brake disc 336. FIG. 6 illustrates clip 390 positioned over surface 362 of rotor brake disc 336 and retainer 382 positioned over clip 390, with flange 383 inserted into cut 325 of rotor brake disc 336. Flange 383 may thus provide tangential support to retainer 382 when clip 390 is positioned over surface 362 of rotor brake disc 336 and retainer 382 is positioned over clip 390. Through the action of first leg 311 and second leg 313 on clip 390 (e.g., first tab 385 engaging first slot 394 and second tab 384 engaging second slot 397), flange 383 of retainer 382 may act to provide a measure of tangential support to clip 390.

Figure 9:
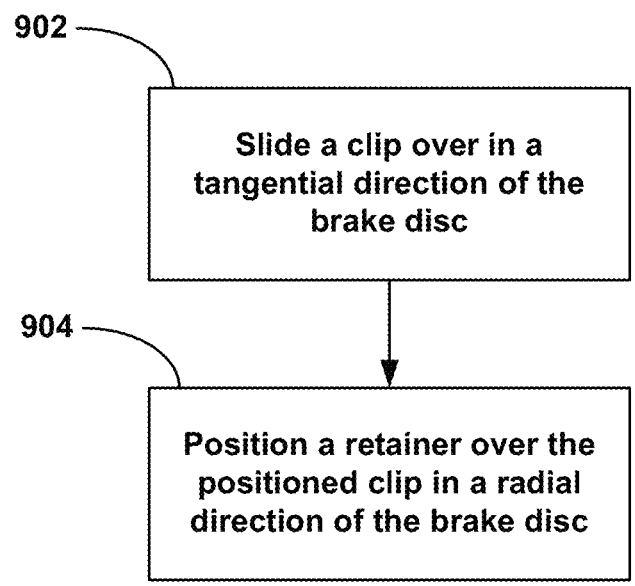
FIG. 9 is a flow diagram illustrating an example technique of installing a drive insert including a clip and a retainer.

FIG. 9 illustrates a flow diagram of an example technique for positioning a drive insert on a drive slot of a brake disc. Although the technique is described with reference to drive insert 380 and rotor brake disc 336 of FIGS. 3-8C, in other examples, the technique may be used with another drive insert and brake disc.

The technique includes positioning clip 390 on rotor brake disc 336 by sliding clip 390 in a tangential direction T of rotor brake disc 336 (902). Clip 390 may be positioned to cover portions of first surface 362 and second surface 365 of rotor brake disc 336, which may be on opposite sides of rotor brake disc 336 and adjacent to drive slot 361 extending at least partially through rotor brake disc 336 in an axial direction of rotor brake disc 336.

Clip 390 may include body section 391 with first arm 396 and second arm 395 extending from body section 391. In some examples, clip 390 is slid (902) tangentially onto rotor brake disc 336 so that first arm 396 covers some portion of first surface 362 and second arm 395 covers some portion of second surface 365. In some examples, a first interior wall 303 of first arm 396 and a second interior wall 307 of second arm 395 may slant away from each other, and may be oriented with respect to rotor brake disc 336 such that clip 390 establishes a dovetail fit with rotor brake disc 336 when clip 390 is slid tangentially onto rotor brake disc 336. Body section 391 may comprise back face 393, and clip 390 may be slid tangentially onto rotor brake disc 336 so that back face 393 engages and/or contacts a torque face 364 of rotor brake disc 336.

The technique further includes positioning retainer 382 over the positioned clip 390 in a radial direction of rotor brake disc 336 (904). Retainer 382 may define a channel 386 configured to receive clip 390 when retainer 382 is positioned over clip 390 in a radial direction. Retainer 382 may comprise a first leg 311 and a second leg 313 which contact clip 390 when retainer 382 is positioned over clip 390 in the radial direction. First leg 311 and second leg 313 may be resiliently biased toward one another by bridge section 315, so that first leg 311 and second leg 313 provide an inward clamping force on clip 390 when retainer 382 is positioned over clip 390 in the radial direction.

In some examples, retainer 382 and clip 390 include structures that are configured to interlock or otherwise mate together to help fix a position of retainer 382 relative to clip 390. For example, first leg 311 of retainer 382 may define first tab 385 configured to be inserted into a first slot 394 defined by first arm 396 of clip 390 when retainer 382 is positioned over clip 390 in the radial direction. In addition, in some examples, second leg 313 of retainer 382 may define a second tab 384 configured to be inserted into a second slot 397 defined by second arm 395 of clip 390 when retainer 382 is positioned over clip 390 in the radial direction. First tab 385 may insert into first slot 394 such that a first bearing surface 321 of first tab 385 and a first retaining surface 317 of first slot 394 oppose one another to limit movement of retainer 382 in a radial direction of rotor brake disc 336. Second tab 384 may insert into second slot 397 such that a second bearing surface 323 of second tab 384 and a second retaining surface 319 of second slot 397 oppose one another to limit movement of retainer 382 in a radial direction of rotor brake disc 336. First tab 385 may insert into first slot 394 such that a first back surface 327 of first tab 385 and a bearing surface 331 of first slot 394 oppose one another to limit movement of retainer 382 in a tangential direction of rotor brake disc 336. Second tab 384 may insert into second slot 397 such that a second back surface 329 of second tab 384 and a bearing surface 333 of second slot 397 oppose one another to limit movement of retainer 382 in a tangential direction of rotor brake disc 336. Positioning retainer 382 over the positioned clip 390 in a radial direction of rotor brake disc 336 may include positioning retainer 382 in a radial direction of rotor brake disc 336 until first tab 385 inserts into first slot 394 and second tab 384 inserts into second slot 397.

First tab 385 may extend in the z direction such that first back surface 327 engages a bearing surface 331 (FIGS. 7A-7C) of first slot 394 when retainer 382 is positioned over clip 390. In a similar manner, second tab 384 may extend in the z direction such that a second back surface 329 of second tab 384 engages a bearing surface 333 (FIGS. 7A-7C) of second slot 397 when retainer 382 is positioned over clip 390.

In some examples, retainer 382 comprises one or more structures configured to engage with (e.g., mate with) brake disc 336 to help further secure retainer 382 relative to brake disc 336 and to further help secure clip 390 relative to brake disc 336 when retainer 382 is positioned over clip 390. For example, retainer 382 may define a flange 383 configured to be inserted into cut 325 of rotor brake disc 336 when retainer 382 is positioned over clip 390. Flange 383 may extend in an axial direction of rotor brake disc 336 when inserted into cut 325 such that, when retainer 382 is positioned over clip 390 in the radial direction, cut 325 acts in opposition to forces acting on retainer 382 in a tangential direction of rotor brake disc 336.

Various examples have been described. These and other examples are within the scope of the following claims.

What is claimed is:

1. An assembly comprising:
  a clip comprising:
    a body section configured to cover at least a portion of a torque face of a brake disc, wherein the torque face is between a first surface of the brake disc and a second surface of the brake disc, wherein the first surface comprises a first side of the brake disc and the second surface comprises a second side of the brake disc opposite the first side, and wherein the first surface and the second surface are adjacent a drive slot of the brake disc extending at least partially through a perimeter of the brake disc in an axial direction of the brake disc;
    a first arm extending from the body section, wherein the first arm is configured to cover at least a portion of the first surface when the body section covers the portion of the torque face, and wherein the first arm defines a first slot; and
    a second arm extending from the body section, wherein the second arm is configured to cover at least a portion of the second surface when the first arm covers the portion of the first surface, and wherein the second arm defines a second slot,
    wherein the clip defines a gap configured to receive a portion of the brake disc when the body section covers the portion of the torque face, and wherein the gap defines a displacement that increases in a radial direction of the brake disc extending away from a perimeter of the brake disc when the gap receives the portion of the brake disc; and
  a retainer configured to be slidable over the clip in the radial direction of the brake disc to position over the clip when the first arm covers the portion of the first surface and the second arm covers the portion of the second surface,
  wherein the retainer is configured to maintain the clip on the brake disc when the retainer is positioned over the clip and the clip experiences a force in a tangential direction of the brake disc,
  wherein the retainer is configured to contact the first arm and the second arm when the retainer is positioned over the clip, and
  wherein the retainer comprises a first tab configured to insert in the first slot and a second tab configured to insert in the second slot when the retainer slides in the radial direction of the brake disc to position over the clip.

2. The assembly of claim 1, wherein the body section comprises:
  a drive face; and
  a back face opposite the drive face,
  wherein the back face is configured to engage a torque face surface defined by the torque face when the body section covers the portion of the torque face.

3. The assembly of claim 2, where the torque face surface defines a torque face surface area, and wherein the back face is configured to contact at least 70% of the torque face surface area when the back face engages the torque face surface.

4. The assembly of claim 1, wherein the retainer defines a channel having a first open end and a second open end opposite the first open end, wherein the channel is configured to surround a portion of the clip when the first tab inserts in the first slot and the second tab inserts into the second slot.

5. The assembly of claim 1, wherein the retainer is configured to exert an inward clamping force between the first tab and the second tab when the first tab is received in the first slot and the second tab is received in the second slot.

6. The assembly of claim 1, wherein the retainer comprises a flange configured to extend in the axial direction of the brake disc and extend in the radial direction of the brake disc when the clip is positioned over the first surface and the second surface and the retainer is positioned over the clip.

7. The assembly of claim 1, wherein the clip is configured to frictionally engage the first surface and the second surface in a rivetless configuration when the retainer is positioned over the clip.

8. A system comprising:
  the brake disc; and
  the assembly of claim 1.

9. The assembly of claim 1, wherein the body section is configured to engage a rotor drive key extending through the drive slot when the clip is positioned over the first surface and the second surface and the retainer is positioned over the clip.

10. The assembly of claim 1, wherein the tangential direction is a first tangential direction, and wherein the first arm is configured to be slidable over the first surface in a second tangential direction of the brake disc and the second arm is configured to be slidable over the second surface in the second tangential direction of the brake disc, wherein the second tangential direction of the brake disc is opposite the first tangential direction of the brake disc.

11. The assembly of claim 1, wherein the first arm and the second arm define the gap.

12. A brake system comprising:
  a brake disc defining:
    a drive slot extending at least partially through a perimeter of the brake disc in an axial direction of the brake disc;
    a first surface adjacent to the drive slot, the first surface comprising a first side of the brake disc;
    a second surface adjacent to the drive slot, the second surface comprising a second side of the brake disc opposite the first side; and
    a torque face between the first surface and the second surface; and a clip comprising:
  a body section configured to cover at least a portion of the torque face;
  a first arm extending from the body section, wherein the first arm is configured to cover at least a portion of the first surface when the body section covers the portion of the torque face, and wherein the first arm defines a first slot; and
  a second arm extending from the body section, wherein the second arm is configured to cover at least a portion of the second surface when the first arm covers the portion of the first surface, and wherein the second arm defines a second slot; and
a retainer configured to be slidable over the clip to secure the clip to the brake disc and maintain the clip on the brake disc when the clip experiences a force in a tangential direction of the brake disc, wherein the retainer is configured to contact the first arm and the second arm when the retainer is positioned over the clip to maintain the retainer positioned on the clip when the retainer experiences the force in the tangential direction of the brake disc, wherein the retainer comprises a first tab configured to insert in the first slot and a second tab configured to insert in the second slot when the retainer is positioned over the clip, and wherein the retainer is resiliently biased to exert an inward clamping force in the axial direction of the brake disc on the first arm and the second arm.

13. The brake system of claim 12, wherein the retainer defines a channel having a first open end and a second open end opposite the first open end, wherein the clip is configured to be at least partially received within the channel when the retainer is positioned over the clip.

14. The brake system of claim 12, wherein the retainer is resiliently biased to generate an inward clamping force between the first tab and the second tab when the first tab is inserted in the first slot and the second tab is inserted in the second slot.

15. The brake system of claim 12, wherein the first arm defines a first arm interior wall and the second arm defines a second arm interior wall substantially facing the first arm interior wall, wherein the clip defines a displacement between the first arm interior wall and the second arm interior wall, and wherein the displacement increases in a radial direction of the brake disc.

16. The brake system of claim 12, wherein the body section is configured to engage a rotor drive key extending through the drive slot when the body section covers the portion of the torque face and the retainer is positioned over the clip.

17. A method comprising:
  positioning a clip on a brake disc, wherein positioning the clip comprises sliding the clip in a tangential direction of the brake disc over a first surface and a second surface of the brake disc, wherein the first surface and the second surface are adjacent to a drive slot at a perimeter of the brake disc, and where the first surface comprises a first side of the brake disc and the second surface comprises a second side opposite the first side; and
  positioning a retainer over the positioned clip in a radial direction of the brake disc, wherein the retainer exerts an inward clamping force on the clip in an axial direction of the brake disc when positioned over the clip, and wherein positioning the retainer over the clip comprises positioning the retainer over the clip in the radial direction of the brake disc until a tab of the retainer inserts in a slot of the clip.

18. The method of claim 17, wherein the tab comprises a first tab and the slot comprise a first slot, and wherein positioning the retainer over the clip comprises positioning the retainer over the clip in the radial direction of the brake disc until a second tab of the retainer inserts in a second slot of the clip.

19. The method of claim 17, wherein positioning the clip on the brake disc comprises covering a portion of a torque face of the drive slot with a body section of the clip, wherein covering the portion of the torque face comprises sliding a first arm of the clip over the first surface and sliding a second arm of the clip over the second surface, wherein the torque face is between the first surface and the second surface.

* * * * *